April 18, 1967    A. E. RODELY    3,314,289
SWIRL FLOW METER TRANSDUCER SYSTEM
Filed May 11, 1964
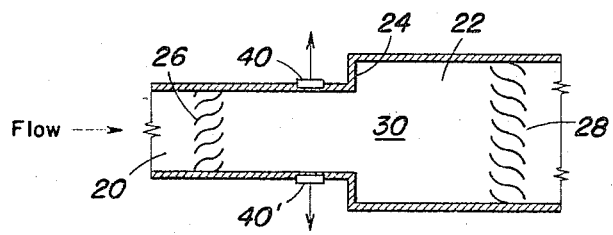
Fig. 1.
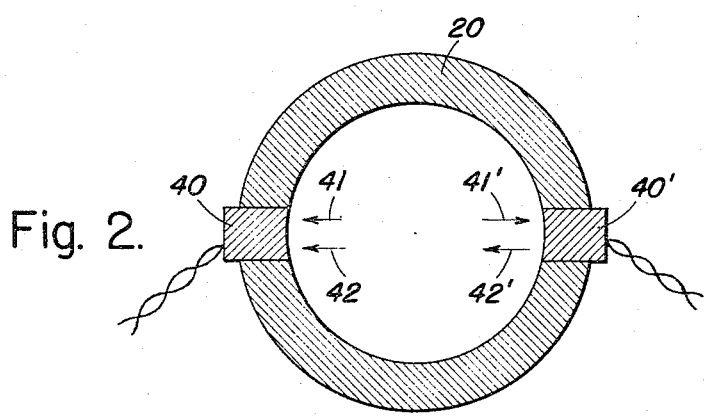
Fig. 2.
Fig. 5.
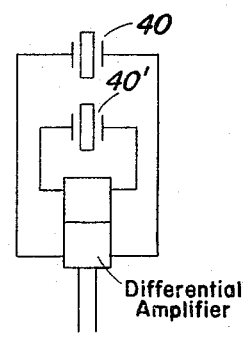
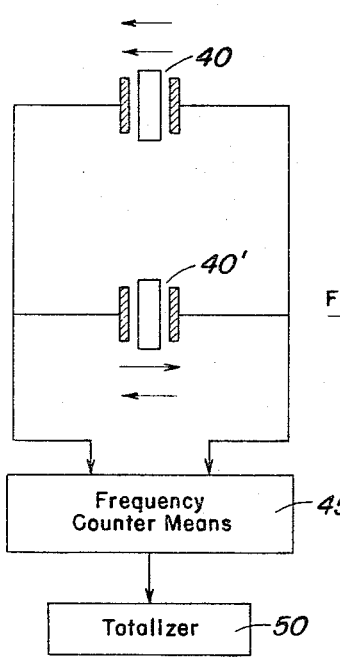
Fig. 3.
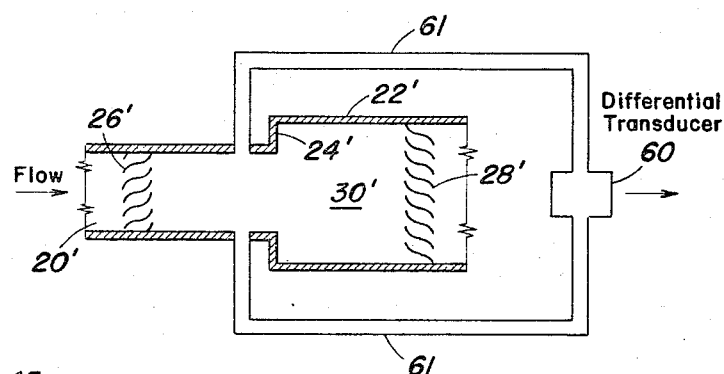
Fig. 4.
INVENTOR
Alan E. Rodely
BY
ATTORNEY United States Patent Office 3,314,289
Patented Apr. 18, 1967

3,314,289
SWIRL FLOW METER TRANSDUCER
SYSTEM
Alan E. Rodely, Scotch Plains, N.J., assignor to American
Radiator & Standard Sanitary Corporation, New York,
N.Y., a corporation of Delaware
Filed May 11, 1964, Ser. No. 366,496
15 Claims. (Cl. 73—194)

This invention relates to volumetric fluid flow measurement and, more particularly, to a novel method of and apparatus for such measurement and a novel transducer arrangement included in the apparatus.

Various basically different arrangements for metering or measuring the flow of fluids in closed conduits, or along confined paths, are known to the art. These different arrangements include, for example, inferential mechanical meters such as those of the turbine-type, pressure differential meters, such as the Venturi, orifice plate, nozzle, Dall tube, laminar flow, and "Lo-Loss" meters, ultrasonic meters, and electromagnetic meters. All of these known types of volumetric fluid flow measuring devices are subjected to various disadvantages such as, for example, high pressure losses, limitations to measuring the flow of liquids only and not being applicable to measuring the flow of gases, errors due to swirl, relatively low accuracies, non-linear response characteristics, relatively long response times, limitations to small ranges of cross sectional flow areas, errors due to non-uniformity in the flow, difficulty in converting the output measurements into readily accessible form, high power requirements in the case of electromagnetic meters, and other errors, most of which are well known to those skilled in the art.

An object of the present invention is to provide volumetric fluid flow measuring apparatus having a high degree of accuracy of the order of better than 0.5%, and utilizing a pressure, temperature or velocity pulse responsive transducer means.

Another object of the invention is to provide, in fluid flow measuring apparatus of the type in which a swirling fluid is made to precess and a novel transducer means responsive solely to pressure, temperature or velocity pulses due to the precession of the swirling fluid.

Still another object of the invention is to provide, in fluid flow measuring apparatus, a novel arrangement of pressure, temperature or velocity pulse responsive transducer means which is sensitive only to pressure, temperature or velocity pulses produced by precession of a swirling fluid and whose output is insensitive to pressure, temperature or velocity pulses due to extraneous pulsations of the fluid and the like.

A further object of the invention is to provide, in fluid flow measuring apparatus, a novel transducer arrangement comprising a pair of transducers arranged in opposed relation to cancel out in-phase pulses due to sonic vibrations and the like, but effective to provide an output responsive to out of phase pulses, such as those due to precession of a swirling fluid.

Still a further object of the invention is to provide, in a fluid flow measuring apparatus, a transducer or pick up arrangement which is operable with either laminar or turbulent flow and across the flow rate range where transition from one to the other type of flow occurs.

Still another object of the invention is to provide a transducer arrangement for fluid flow measuring apparatus, and which does not have any moving parts.

A further object of the invention is to provide a transducer arrangement for fluid flow measuring apparatus, and which has improved resistance to loss of calibration with time.

Yet a further object of the invention is to provide a transducer arrangement for fluid flow measuring apparatus, and which can be used with practically any size of pipe or fluid conductor means and over an extended flow rate range.

Yet another object is to provide a transducer arrangement for fluid flow measuring apparatus comprising two transducers positioned diametrically opposite each other in a confined flow path and which discriminate between in-phase signals and out of phase signals.

An object of the invention is to provide a novel method of measuring fluid flow along a confined path.

A further object of the invention is to provide such a method involving the sensing of signals having a frequency which corresponds to the rate of fluid flow, and includes the step of discriminating between such pulses and fortuitous pulses not related to the fluid flow rate.

Other objects and many of the attendant advantages of this invention will be readily appreciated as the method and apparatus become better understood by reference to the following detailed description when considered in connection with the accompanying drawings wherein:

FIG. 1 is a somewhat schematic longitudinal sectional view of fluid flow measuring apparatus embodying the present invention;

FIG. 2 is a somewhat schematic diametric sectional view of a transducer arrangement shown in FIG. 1;

FIGS. 3 and 5 are schematic wiring diagrams of the transducer arrangement forming a feature of the invention; and FIG. 4 is a view similar to FIG. 1 but illustrating a modification of the invention.

In accordance with the present invention, the fluid whose flow rate is to be measured is first forced to assume a swirl component by converting pressure energy into kinetic energy, and then the swirling fluid is caused to precess, preferably at a rate proportional to the fluid flow rate. These effects can be achieved by confining the flowing fluid within a conductor means having operatively associated therewith swirl means effective to urge the fluid flowing through the conductor means to assume a swirl condition. The swirling fluid is then caused to precess by a suitable arrangement such as, for example, directing the swirling fluid to flow into an enlarged cross-sectional area. The enlarged area, or the increase in area, promotes a particular kind of hydro-dynamic instability which causes the low pressure center of the swirling fluid to precess at a discrete frequency about the center line of the fluid conductor means or fluid flow path. If the center line of the swirling fluid could be made visible by suitable means, it would be seen to trace out a conical shape at the increase in cross-sectional area. A further description of this phenomenon can be found in: the application for Controlled Precess Device, Ser. No. 316,640, now Patent No. 3,279,251, filed Oct. 16, 1963, by Robert C. Chanaud, assigned to the same assignee; "A Vortex Whistle," B. Vonnegut, Journal of the Acoustical Society of America, vol. 26, 1954, pp. 18–20; "Experiments Concerning the Vortex Whistle," R. C. Chanaud, vol. 35, No. 7, 1963, pp. 953–960; and Vonnegut Patent No. 2,794,341, dated June 4, 1957.

This precession, which will be hereinafter referred to as "swirl precession," has a rate which, in certain cases, is directly proportional to the mean flow rate of the flow. Thus, a suitable sensor means exposed to the precessing swirling fluid, can detect this cycling of the swirl precession and thus be made to transmit a signal to a device for indicating the flow rate. Good results are obtained when the sensor means is positioned in the vicinity of the enlarged area or the area increase.

When a transducer is used as the sensor for the rate of precession of a swirling fluid flowing along a confined path, the transducer will not only record or sense the fluctuations due to the precessing swirl, but also will be sensitive to pressure or velocity or temperature pulse waves, hereinafter referred to as extraneous pulsations, which pass down the fluid conductor means or confined path. It is to be understood, however, that extraneous pulsations include not only those in the audible range, but pulsations in the subsonic, or ultrasonic range either separately or in combination. Thus, the output of such a transducer will not be representative of the frequency of precession of the swirl and, therefore, will not give a true indication of the flow rate.

In one embodiment of the present invention, a pair of transducers are arranged in opposed relation transverse the fluid conductor means or confined flow path, as by being diametrically opposite each other along a pipe constituting the fluid conductor means. In this case, pulses due to extraneous pulsations will be in-phase with respect to both transducers. However, the pulses due to the precessing swirl will be out of phase with respect to the two transducers by substantially 180°.

By virtue of this in-phase relation of the extraneous pulsations and the out of phase relation of the pulses due to the precessing swirl, an output which is responsive only to the out of phase pulses can be provided by connecting the electrical outputs of both transducers in parallel or series with each other or by using an electronic differential amplifier. With such electrical connection arrangements, the outputs due to pulses resulting from extraneous pulsations will cancel each other due to their being in-phase with respect to both transducers. However, the outputs responsive to pulses from the precessing swirling fluid, and which are out of phase with each other, will provide a combined output which is responsive only to the out of phase pulses. Thereby, the use of two transducers arranged in opposed relation transverse of a fluid conductor means will provide an output signal proportional to the frequency of precession of a swirling fluid. Thus, an output signal is provided which is a measure of the rate of flow of the fluid.

In another embodiment of the invention, a single differential transducer is connected to two diametrically opposite points of the fluid conductor means or confined flow path. In this case, the in-phase pulses due to extraneous pulsations will be in opposition at the differential transducer and this will produce substantially no output. On the other hand, the out of phase pulses due to the precessing swirl will produce an output which is double that of a single transducer connected to only one point along the fluid conductor means or confined flow path.

Referring to FIG. 1, a flow meter in accordance with the invention is illustrated as including a fluid conductor means having an entrance section 20 which communicates with an enlarged cross-sectional area 30 in a portion 22 through the medium of a relatively abrupt transition or coupling means 24. For example, the diameter of section 22 may be substantially larger than the diameter of section 20, to provide the enlarged cross-sectional area 30. The transition or coupling area 24 may be a wall extending diametrically of the fluid conductor means, or the wall 24 may slope to provide a gradually merging transition section between portions 20 and 22.

Swirl means 26 are operatively associated with portion 20 of the fluid conductor means to force the fluid flowing therethrough into a swirling motion. Swirl means 26 can be in the form of fixed blades positioned within the interior surface of the conductor means 20, or of vanes positioned along the interior surface of the conductor means 20.

The fluid whose flow rate is to be measured is delivered to the portion 20 of the fluid conductor means and exits therefrom into the portion 22. Swirl means 26 forces the fluid, which may be either a gas or a liquid, into a swirling state. The presence of enlargement 30 which the fluid encounters as it flows from the section 20, which latter may be a pipe having a substantially circular cross section, and into the portion 22, which also may be a pipe having a circular cross section, causes the swirling fluid to become unstable and to precess. Actually, the center or axis of the swirling fluid traces a cone. The greater the rate of flow of the fluid, the greater the frequency at which the axis of the swirling fluid precesses. By measuring or sensing the frequency of precession of the swirling fluid, an indication of the volumetric flow rate may be obtained.

To measure the flow rate, a suitable sensor means may be associated with the portion 20 of the fluid conductor means downstream of the swirl means 26 and in the vicinity of the enlarged area portion 30. The output of such a sensor means can be connected to a frequency counter which will count the frequency of precession of the swirling fluid in, for example, cycles per second, and a totalizer may be fed from the frequency counter to provide the total of the number of cycles of precession during a specific time interval. The frequency counter indicates the instantaneous flow rate and the totalizer indicates the total flow during a specific time period.

In accordance with one preferred embodiment of the invention, the sensor means comprises a pair of pressure transducers 40 and 40' such as piezo-electric elements arranged in the wall of pipe or section 20 downstream of swirl means 26 and upstream of enlarged area 30. The transducers 40 and 40' are arranged in diametrically opposed relation. As stated, pressure transducers such as 40 and 40' are sensitive not only to the pressure pulse due to the precession of the swirling fluid, but are also sensitive to extraneous pulsations passing along the fluid conductor means. With respect to extraneous pulsations of the fluid, a sound wave traveling along the fluid conductor means will effect a positive pressure pulse against each of the transducers 40 and 40' at the same instant. In other words, the pressure pulses due to extraneous pulsation are in phase with respect to both transducers 40 and 40'. This is indicated by the arrows 41 and 41' of FIG. 2, which represent the pressure pulses due to extraneous pulsations.

However, with respect to pressure pulses due to the precession of the swirling fluid, whereby the low pressure center of the swirling fluid revolves about the axis of the fluid conductor means, the pulses on the two transducers 40 and 40' are substantially 180° out of phase as indicated by the arrows 42 and 42'. That is, the low pressure area of the swirling fluid is effective upon transducer 40', for example, at substantially a 180° angular displacement in time from its effect upon the transducer 40.

Stated another way, and assuming that extraneous pulsations comprise a series of alternating positive and negative pulses along the fluid conductor means, a first positive pulse will be effective upon both transducers 40 and 40' at the same time, and the succeeding negative pulses will be effective upon the transducers 40 and 40' simultaneously. Thus, both transducers 40 and 40' will be simultaneously subjected to a positive pulse and a moment later will be simultaneously subjected to a negative pulse, or a reduction in pressure. The pulses due to extraneous pulsations are thus in phase with respect to both transducers 40 and 40'.

However, with respect to the precessing swirling fluid, when the point of lowest pressure is nearer to the transducer 40', it will be further from the transducer 40, and vice versa. Thus, with respect to the pressure pulses due to the precession of the swirling fluid, these pulses are out of phase by substantially 180° with respect to both transducers.

It is possible to take advantage of these relationships by connecting the two transducers 40 and 40' in parallel or in series in an electric circuit. With the arrangement shown in FIG. 3, the in-phase pressure pulses due to extraneous pulsations oppose each other and thus cancel each other. The same results are obtained with the arrangement of FIG. 5 wherein the sensing means are connected to a differential amplifier. If desired, the sensing means can be connected in series. In the series network the differential amplifier is not required. On the other hand, the out of phase pressure pulses due to the precession of the swirling fluid are additive and constitute the combined output of the two transducers. As a result, the in-phase pressure pulses across the fluid conductor means 20 are greatly reduced in value if not completely nullified, and the out of phase pressure pulse may, therefore, be measured both as to the frequency and as to amplitude. The out of phase output signals are applied to activate a frequency counter means shown schematically at 45 which provides an instantaneous indication of the frequency of the precession of the swirling fluid and, thus, of its flow rate. The output of the frequency counter means may be applied to a totalizer 50 which provides the total of the cycles of precession of the swirling fluid over a predetermined time interval and thus an indication of the total flow over a predetermined time interval. Several pairs of transducers spaced angularly around the pipe would increase the number of pulses per unit of time and enable a more accurate evaluation of the flow rate to be made.

If desired, deswirl means 28 can be operatively associated with portion 22 of the fluid conductor means, downstream of the transition zone 24. Deswirl means 28 can be used to recapture some of the pressure loss caused by the presence of swirl means 26, and can be in the form of fixed blades positioned within the fluid conductor means portion 22. Alternatively, deswirl means 28 could be grooves or the like on the interior surface of portion 22 of the fluid conductor means, or, stated another way, it may have the same form and configuration, but in a reverse direction, as the swirl means 26. The deswirl means 28 will tend to remove the swirl to straighten out the fluid flow.

In the embodiment of the invention shown in FIG. 4, parts corresponding to those of FIGS. 1 and 2 have been given the same reference characters primed. Insofar as the fluid conductor means or confined flow path are concerned, the arrangement is identical with that of FIG. 1, so that further description would be repetitious.

However, in this embodiment of the invention, a single differential pressure transducer 60 is subjected to pressures at a pair of diametrically opposed points along the fluid conductor means such as 20'. For this purpose, a pair of pressure taps 61, 61 are connected in communication with pipe 20' at a pair of respective diametrically opposite points in the vicinity of transition zone 24' between pipe 20' and pipe 22'. The other ends of these taps are connected to opposite sides of the differential transducer 60.

With the foregoing arrangement, in phase pressure pulses or variations, such as caused by extraneous pulsations, will not result in any output from differential transducer 60, because, at transducer 60, these in-phase pressure pulses are in opposition. However, the out of phase pressure pulses or variations due to the precessing swirl will produce an output which is twice that of a single pressure transducer connected at only one point along the flow path. Thus, the differential transducer arrangement of FIG. 4 effects the elimination of extraneous signals and, at the same time amplifies the desired pressure pulse signals by a factor of two (2).

Furthermore, the differential transducer 60 is insensitive to the effects of the static pressure inside the pipe, and, in some cases, this may mitigate design problems with respect to the transducer. Other advantages with respect to a pair of transducers, as in the arrangement of FIGS. 1, 2 and 3, include the elimination of the necessity for amplitude sensitivity matching, simplicity of a single transducer, greater reliability, and decreased cost.

In the ararngement of FIG. 4, the output of transducer 60 can be applied directly to frequency counter means 45 (FIG. 3). If several sets such as shown in FIG. 4 are spaced angularly around pipe 20', the number of pulse variations per unit of time can be increased, thus obtaining a more acurate evaluation of the flow rate.

While specific embodiments of the invention have been shown and described in detail to illustrate the application of the principles of the invention, it will be understood that the invention may be embodied otherwise without departing from such principles.

What is claimed is:

1. Fluid flow measuring apparatus comprising, in combination, fluid conductor means; swirl means operatively associated with said fluid conductor means and effective to urge fluid flowing through the latter to assume a swirl condition; the cross-sectional area of said fluid conductor means being effective to cause the swirling fluid to precess at a rate proportional to the fluid flow rate; sensing means operatively associated with said fluid conductor means and providing an electrical output responsive to pulses in said fluid conductor means; and electrical measuring circuits connected to the output of said sensing means, said circuits being connected to substantially nullify electrical outputs due to pulses resulting from extraneous pulsations; whereby said electrical measuring circuit is responsive only to pulses resulting from the such precession of the swirling fluid.

2. Fluid flow measuring apparatus comprising, in combination, fluid conductor means; means operatively associated with said fluid conductor means and effective to urge fluid flowing through the latter to assume a swirl condition; the cross-sectional area of said fluid conductor means being effective to cause the swirling fluid to precess; a pair of sensing means arranged in opposed relation transversely of said fluid conductor means; said sensing means being sensitive to pulses due to extraneous pulsations along said fluid conductor means and which are in phase with respect to both transducers, and to pulses due to the precessing swirling fluid and which are out of phase with respect to both transducers; said sensing means providing respective pulse responsive electrical outputs; and electrical circuit means electrically interconnecting said sensing means and effective to provide a combined electrical output responsive only to said out of phase pulses.

3. Fliud flow measuring apparatus comprising, in combination, fluid conductor means; swirl means operatively associated with said fluid conductor means and effective to urge fluid flowing through the latter to assume a swirl condition; the cross-sectional area of said fluid conductor means being effective to cause the swirling fluid to precess; a pair of sensing means arranged in opposed relation transversely of said fluid conductor means; said sensing means being sensitive to pulses due to extraneous pulsations along said fluid conductor means and which are in phase with respect to both sensing means, and to pulses due to the precessing swirling fluid and which are out of phase with respect to both transducers; and sensing means providing respective pulse responsive electrical outputs; and means electrically connecting said sensing means to provide a combined electrical output responsive only to said out of phase pulses.

4. The combination of claim 3 wherein said sensing means are coupled in parallel.

5. The combination of claim 3 wherein said sensing means are coupled to a differential amplifier.

6. Fluid flow measuring apparatus comprising in combination, fluid conductor means; swirl means operatively associated with said fluid conductor means and effective to urge fluid flowing through the latter to assume a swirl condition; the cross-sectional area of said fluid conductor means being effective to cause the swirling fluid to precess; a pair of sensing means arranged in opposed relation transversely of said fluid conductor means; said sensing means being sensitive to pulses due to extraneous pulsations along said fluid conductor means and which are in phase with respect to both sensing means, and to pulses due to the precessing swirling fluid and which are out of phase with respect to both sensing means; and electric circuit means electrically interconnecting said sensing means to provide a combined electrical output responsive only to said out of phase pulses.

7. The combination of claim 6 wherein said sensing means comprise piezo-electric crystal transducers.

8. The combination of claim 6 wherein said sensing means comprise pressure sensitive transducers.

9. Fluid flow measuring apparatus comprising, in combination, fluid conductor means; swirl means operatively associated with said fluid conductor means and effective to urge fluid flowing through the latter to assume a swirl condition; the cross-sectional area of said fluid conductor means being effective to cause the swirling fluid to precess; a pair of piezo-electric crystal transducers arranged in opposed relation transversely of said fluid conductor means; said transducers being sensitive to pressure pulses due to extraneous pulsations along said fluid conductor means and which are in phase with respect to both transducers, and to pulses due to the precessing swirling fluid and which are out of phase with respect to both transducers; and means electrically connecting said transducers in parallel to provide a combined electrical output responsive only to said out of phase pulses.

10. Fluid flow measuring apparatus comprising, in combination, fluid conductor means; swirl means operatively associated with said fluid conductor means and effective to urge fluid flowing through the latter to assume a swirl condition; the cross-sectional area of said fluid conductor means being effective to cause the swirling fluid to precess; a pair of piezo-electric crystal transducers arranged in opposed relation transversely of said fluid conductor means; said transducers being sensitive to pressure pulses due to extraneous pulsations along said fluid conductor means and which are in phase with respect to both transducers, and to pressure pulses due to the precessing swirling fluid and which are out of phase with respect to both transducers; means electrically connecting said transducers in parallel to provide a combined electrical output responsive only to said out of phase pulses; and frequency counting means connected to said combined electrical output to provide an indication of the instantaneous flow rate.

11. Fluid flow measuring apparatus comprising, in combination, fluid conductor means; swirl means operatively associated with said fluid conductor means and effective to urge fluid flowing through the latter to assume a swirl condition; the cross-sectional area of said fluid conductor means being effective to cause the swirling fluid to precess at a rate proportional to the fluid flow rate; a pair of piezo-electric crystal transducers arranged in opposed relation transversely of said fluid conductor means; said transducers being sensitive to pressure pulses due to extraneous pulsations along said fluid conductor means and which are in phase with respect to both transducers, and to pressure pulses due to the precessing swirling fluid and which are out of phase with respect to both transducers; means electrically connecting said transducers in parallel to provide a combined electrical output responsive only to said out of phase pulses; and pulse counting means connected to said combined electrical output to provide an indication of the fluid flow along said fluid conductor means.

12. Fluid flow measuring apparatus comprising, in combination, fluid conductor means; swirl means operatively associated with said fluid conductor means and effective to urge fluid flowing through the latter to assume a swirl condition; the cross-sectional area of said fluid conductor means being effective to cause the swirling fluid to precess at a rate proportional to the fluid flow rate; a differential sensing means for sensing for fluid dynamic indicia at a pair of transversely opposed points along said fluid conductor means which are in-phase with respect to both points, and for sensing for said fluid dynamic indicia due to the precessing swirling fluid which are out of phase with respect to both points; and pulse counting means connected to said transducer to provide an indication of the fluid flow along said fluid conductor means.

13. The combination of claim 12 wherein said sensing means comprises piezo-electric crystal transducers sensitive to fluid pressure.

14. The combination of claim 12 wherein said sensing means comprises transducers sensitive to fluid pressure.

15. Fluid flow measuring apparatus, as claimed in claim 12 in which said points are diametrically opposite each other.

References Cited by the Examiner

UNITED STATES PATENTS 2,794,341   6/1957   Vonnegut _____ 73—194

RICHARD C. QUEISSER, *Primary Examiner.*

L. R. FRANKLIN, C. A. RUEHL, *Assistant Examiners.*